United States Patent [19]

Liberman et al.

[11] Patent Number: 5,807,598
[45] Date of Patent: Sep. 15, 1998

[54] METHOD OF RECONSTITUTING MEAT

[75] Inventors: Barnet L. Liberman, New York, N.Y.; Peter H. Glidden, Sr., Whiting, Me.

[73] Assignee: Winterlab Limited, New York, N.Y.

[21] Appl. No.: 747,327

[22] Filed: Nov. 12, 1996

[51] Int. Cl.$^6$ .............................. A23B 4/01; A23L 3/26; A23L 3/365; A23L 3/37
[52] U.S. Cl. .............................. 426/240; 62/64; 426/513; 426/520; 426/524; 426/641
[58] Field of Search ..................... 426/240, 513, 426/520, 524, 641, 523; 62/62, 64

[56] References Cited

U.S. PATENT DOCUMENTS

| 2,752,252 | 6/1956 | Condon | 426/513 |
|---|---|---|---|
| 3,554,773 | 1/1971 | Shults et al. | 426/240 |
| 3,728,136 | 4/1973 | Langlands | 426/513 |
| 3,761,283 | 9/1973 | Snyder | 426/240 |
| 4,036,997 | 7/1977 | Verburg | 426/513 X |
| 4,201,796 | 5/1980 | Harkins | 426/523 X |
| 4,654,217 | 3/1987 | Nagoshi | 426/524 |
| 4,657,768 | 4/1987 | Nagoshi | 426/524 |
| 4,689,963 | 9/1987 | Sakai | 62/64 |
| 4,714,618 | 12/1987 | Matsuda | 426/524 |
| 4,840,034 | 6/1989 | Liberman | 62/64 |
| 4,840,035 | 6/1989 | Liberman | 62/64 |
| 5,001,047 | 3/1991 | Liberman | 62/64 |
| 5,472,725 | 12/1995 | Mendenhall | 426/524 X |

OTHER PUBLICATIONS

Copy of Patent Application Showa 63–262652 of Oct. 17, 1988.

*Primary Examiner*—Arthur L. Corbin
*Attorney, Agent, or Firm*—Cohen, Pontani, Lieberman & Payane

[57] ABSTRACT

A method of reconstituting meat from trims of fish, poultry, pork, beef or the like. The method includes the steps of freezing the trims, defrosting the trims, configuring the defrosted trims and then refreezing the configured trims using a cooled brine. The cooled brine is cooled to a temperature between about −22° and −46° F., and includes at least 0.005% by weight of cruciferous oil, such as rapeseed oil. The method does not require the use of any artificial binding agent for holding the reconstituted meat together, even during normal cooking conditions.

21 Claims, 1 Drawing Sheet

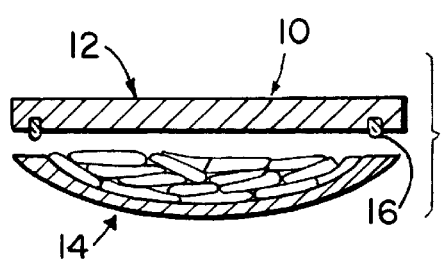
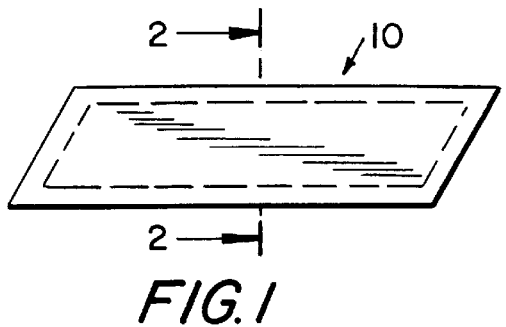
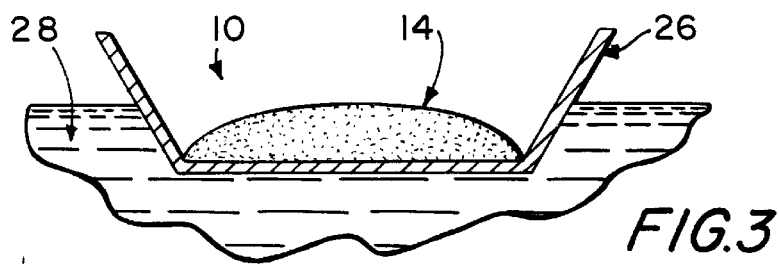
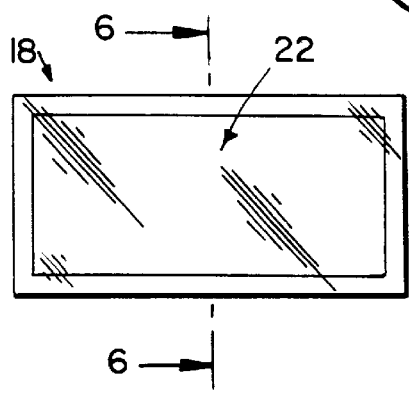
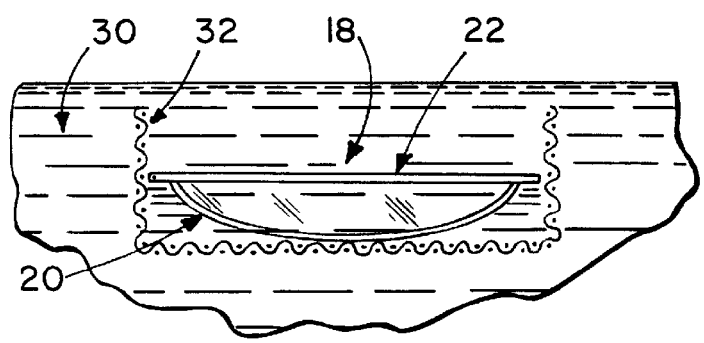
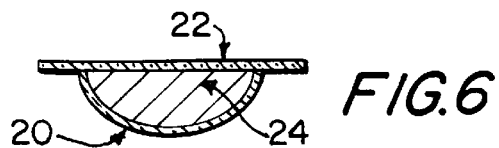

METHOD OF RECONSTITUTING MEAT

BACKGROUND OF THE INVENTION

1. Field of the Invention

This invention relates to methods of reconstituting meat from trims of fish, poultry or the like and, in particular, a method of reconstituting meat which requires no binding agents.

2. Description of the Prior Art

Various methods have been devised to reconstitute meat from trims or scrap pieces of beef, veal, pork, fish, poultry or the like for maximizing recovery of meat products therefrom. One known method of reconstituting meat makes use of binding agents for holding pieces of trims together so that the reconstituted meat does not fall apart during cooking. The known method includes the steps of coating fresh, i.e. not previously frozen, trims with a commercially available binding agent or binder, packing the trims in a mold, then allowing the binding agent to cure at about 35° F. for one hour. An example of a commercially available binder contains 0.5% trans-glutaminase, 2.5% sodium polyphosphate, 2.5% anhydrous sodium pyrophosphate, 2.0% silicon dioxide, and 92.5% casein. Another example of a binding agent contains 75.0% protein (from milk and/or egg) and 25.0% calcium chloride and/or sodium chloride.

A disadvantage of this known method is that the binding agent adds to the reconstituted meat "chemicals" which many consumers deem undesirable for consumption. Another disadvantage is that the binding agent sometimes gives the reconstituted meat an "unnatural" resiliency or flavor. As expected, these shortcomings decrease the marketability of reconstituted meat.

SUMMARY OF THE INVENTION

Accordingly, an object of the invention is to provide a method for reconstituting meat from trims or scrap pieces of fish, poultry, beef or pork or the like such that the reconstituted meat is closely similar to a whole-meat product in terms of its qualities such as, for example, appearance, taste, resiliency and aroma.

Another object of the invention is to provide a method of reconstituting meat which does not require the use of any binder or binding agent and yet the reconstituted meat does not fall apart during cooking.

An embodiment of the method of reconstituting meat in accordance with the present invention includes the steps of:

a. freezing the trims;
b. defrosting the trims;
c. configuring the defrosted trims to form a preselected shape; and
d. freezing the configured trims by placing the configured trims in a heat transfer relationship with a cooled brine containing at least about 0.005% cruciferous oil such as rapeseed oil.

Other objects and features of the present invention will become apparent from the following detailed description taken together with the drawings.

BRIEF DESCRIPTION OF THE DRAWINGS

In the drawings, wherein like reference characters denote similar elements throughout the several views:

FIG. 1 is a top view of a two-piece mold with trims disposed therein in accordance with the present invention;

FIG. 2 is a sectional view of the two-piece mold of FIG. 1 taken along the plane 2—2;

FIG. 3 is a sectional view of a tray disposed in a brine solution with the two-piece mold of FIG. 1 disposed within the tray in heat transfer relationship with the brine solution;

FIG. 4 is a top view of a unitary mold having a preformed portion in accordance with another form of the present invention;

FIG. 5 is a sectional view of a rack with the mold of FIG. 4 disposed therein in heat transfer relationship with a brine solution; and FIG. 6 is a sectional view of the mold of FIG. 4 taken along line 6—6.

DETAILED DESCRIPTION OF THE PRESENTLY PREFERRED EMBODIMENTS

As used herein the term "meat" is intended to include fish, shell-fish, poultry, beef, pork including ham, veal, various game meats such as venison, and any other type of animal product commonly referred to as meat or fish.

As used herein, the term "trims" is intended to include not only pieces of meat trimmed from a larger piece, but also to include other small pieces such as scrap or meat flakes or the like.

As used herein the term "reconstituted meat product" is a product comprising a multiplicity of small pieces or bits of meat, i.e., trims as above defined, which are held together to form a larger product such as, for example, a portion size product.

A difficulty in making reconstituted meat product is that the reconstituted meat has a tendency to separate and fall apart after a freeze-defrost cycle. This problem is exacerbated, if not made unsolvable, when the reconstitution process uses no binding agents. The inability of the small pieces of meat, i.e., trims, to hold together may be due to: (1) inadequate or lack of cohesive bonds between adjoining trims, and/or (2) dissolution of these bonds by the "purge" (i.e., the fluid released from ruptured cells of a previously frozen animal tissue when defrosted, and which typically collects on the outer surface of the defrosted meat).

An unexpected discovery made during the course of the present invention is that the "purge" —which is inevitably created during freezing—contains an adequate amount of cellular protein with which to join, adhere or otherwise holds the trims together, thereby rendering the use of "artificial" binding agents unnecessary. When properly "cured", the released cellular protein (which may be viewed as an "in-situ binder") functions as a "glue" by, for example, becoming denatured and cross-linked and gelatinous in nature and forms an adhesive or cohesive bond between adjoining trims. Through the use of a unique freezing method which minimizes purge, as described hereafter, the reconstituted meat stays together even under cooking conditions.

Therefore, in accordance with a preferred embodiment of the present invention, the first step of preparing reconstituted meat from fish, poultry, beef, pork or the like is to freeze the trims of such products to, for example, about −15° F. so that a minimal but yet adequate amount of cells are ruptured so that sufficient purge is produced during subsequent defrosting to bind the trims. This initial freezing step may be accomplished by means of a blast freezer or any other conventional freezer. Preferably, however, the trims are frozen using the "cooled-brine methods" (TruFresh®) disclosed in U.S. Pat. Nos. 4,601,909; 4,654,217; 4,657,768; 4,689,963; 4,743,343; 4,840,034; 4,840,035; and 5,001,047—the contents of which patents are incorporated herein by reference in their entirety. As described therein, these cooled-brine methods, unlike conventional freezing methods, advantageously maintain the freshness or tastiness of the meat by maintaining maximum cellular integrity of the meat tissue and minimizing the amount of purge during the freezing process.

Although brine solutions of various compositions, as disclosed in the aforementioned patents may be used, at least about 0.005% by weight of cruciferous oil should be included in the brine. Preferably, about 0.005% to 0.018% by weight of cruciferous oil such as rapeseed oil should be used. Alternatively, the amount of cruciferous oil may be selected such that a maximum amount of the oil is dissolved in the brine. Presently preferred brine composition includes, by weight, about 43.18% water, about 44.06% propylene glycol, about 12.75% calcium chloride, and about 0.01% rapeseed oil. The temperature of the brine should be between about −22° and −46° F., and preferably between about −37° and −41° F.

The amount of purge produced should be at least about 3% by weight, but most preferably about 4–6% by weight so as to minimize degradation to the meat. Alternatively, it is contemplated that, instead of freezing, external forces may be applied to the trims to rupture cells and thus produce the requisite amount of purge therefrom.

After the initial cell rupturing step such as by freezing, the frozen trims are defrosted preferably at a temperature above the freezing point of the purge and preferably not above about 40° F., and preferably between about 35°–37° F. for preferably about 10 to 30 minutes so as to produce purge. This temperature range also minimizes bacterial growth. At this point in the process if desired (although optional in view of the teachings of the present invention), the trims may be treated by placing on the outside surfaces a minimal amount of a binding agent (e.g. about 1% by weight) such as, for example, calcium chloride, sodium chloride, and/or ground dehydrated bone of the meat being processed, to further enhance the cohesive bonds between adjoining trims. These trims, either treated or untreated, may then be configured to form a desired or preselected size and shape by, for example, placing or arranging the trims inside at least a portion of a mold or any structure which defines, at least in part, the shape of the reconstituted meat. The mold may be in the shape of, for example, a fish fillet, in the case where the reconstituted meat comprises trims of a salmon or other fish or shaped like a steak or hamburger patty if the meat is beef. In the case of tuna trims, the mold (though not shown) may resemble a tuna steak.

As shown in FIG. 1, a fillet-shaped mold 10 may, for example, be constructed of a flat top piece 12 with parallel sides and an arcuate bottom piece 14 which may be made of stainless steel, plastic or any other suitable food preparation material. The mold 10 may further include a sealing mechanism such as, for example, a gasket 16 for liquid-sealing thereof for preventing contamination of the meat from the brine during the freezing process. It is contemplated that the mold 10 may further be provided with a latch or any locking mechanism (not shown) which releasably interlocks the top and bottom pieces 12, 14 of the mold 10 and compresses the trims disposed therebetween such that the trims are in intimate contact with each other and any gaps formed between the trims are substantially eliminated. It is believed that this intimate contact between adjoining trim pieces helps improve the cohesive bonds formed by the released cellular protein in the purge.

If a mold having no sealing gaskets is used, the mold should be placed in a gas-impermeable bag 18 which may then be vacuum-sealed at preferably about 14 millibars of vacuum. The vacuum bag also acts to protect the molded trims from being contaminated by the cooling medium such as, for example, the brine preferably used during the freezing process. In the case of a two-piece fish-fillet mold, the vacuum sealing process forces the top and bottom pieces of the mold toward each other, thereby compressing the trims disposed therewithin.

FIG. 4 illustrates a unitary mold 18 including a flexible preformed or preshaped portion 20 in which the trims may be placed and a flexible cover portion 22 that is heat sealed to the preshaped portion 20 after the trims are placed therein and after the requisite vacuum is created therewithin, as by the use of an evacuated space in which the filling and sending of the mold are performed, i.e. a Multivac®. The mold 18 may be constructed of a thermoplastic suitable for food preparation. The vacuum-induced compressive forces cause the flexible mold 18 and/or cover 22 to constrict against the configured trims thereby eliminating air gaps between the mold 18 and the trims 24 and thereby increasing the heat transfer efficiency between the trims and the cooling medium such as, for example, the cooled brine. Moreover, the compression provides the additional benefit that the trims are placed in intimate contact with each other so as to increase the effectiveness of the bond between adjoining surfaces of the trims since air gaps between adjoining trims are substantially eliminated, resulting in a reconstituted meat product of greater density which more closely approximates the density of a whole meat product.

After the trims are placed in a mold and the mold is preferably sealed, the configured product resulting from the trims is preferably held at a temperature of preferably about 35° F. to 37° F. for a length of time which ensures that the released cellular protein becomes sufficiently cross-linked or gelatinous to bond the trims to one another. The holding time varies according to factors such as, surface area and/or volume of configured trims. Thus, for a piece of configured salmon trims having the dimensions of 6"×8"×1", it has been found that the minimum holding time is about 35 minutes at the temperature range of about 35° F. to 37° F. Of course, different holding periods are required for different sizes of configured trims and for different brine temperatures.

After the requisite holding time, the molded or configured trims may then be frozen a second time by, preferably, placing the mold with the trims therein in heat transfer relationship with a cooled brine. For example, as illustrated in FIG. 3, the mold 10 may be placed in a tray 26 which floats on the cooled brine 28. For another example, as depicted schematically in FIG. 5, the mold 18 is properly sealed and then immersed in the cooled brine 30 while it is supported in rack 32. Rack 32 is so constructed such that the cooled brine 30 is permitted to flow freely about the mold 18. For this second freezing step, it has been found that the use of the cooled-brine methods is most advantageous in enabling the molded trims to hold together by "curing" the released cellular protein and by maintaining the cellular integrity of the meat tissue during freezing so that only a minimal amount of purge, e.g. 2–3% by weight, is released.

It is noted here that the duration and temperature of this freezing step depends on the size, weight, surface area and/or density of the reconstituted meat. Such duration and temperature parameters should be chosen so as to minimize formation of ice crystals in the reconstituted meat. The ice crystals could rupture the cell membranes and cause the production of purge which degrades the structural integrity of the reconstituted meat product by, for example, dissolving the cohesive bonds between the adjoining trims.

After the frozen reconstituted meat has reached a preferred core or inner temperature of, for example, about −25° F., the mold may be removed from the cooled brine and the reconstituted meat removed from the mold and cut into portions having the desired size and weight for users such as restaurateurs.

To add flavor, to decontaminate the surfaces of the portions (i.e. to destroy the bacteria thereon) and/or to increase the bodily integrity of the reconstituted meat, the portions (preferably while still frozen) may be seared over flame or in a broiler heated to about 600° to 800° F., for about 2.0–30.0 seconds, depending on the shapes and sizes of the portions. It is believed that the searing step causes the tissue fibers at the surface of each portion to interlink thereby enhancing the surface strength of the portions. Optionally, these portions may also be seared through deep-frying, e.g., immersed in boiling oil (preferably, vegetable oil such as sesame oil), for a period of about 10 to 60 seconds. Alternatively or in addition thereto, the portions may be char-marked by passing under charring rings having a temperature of about 1,200° to 1,500° F., for about 2.0 to 3.5 seconds whereby the charring rings rollingly contact the reconstituted meat surface. The char-marking operation causes the tissue fibers in contact with the rings to desiccate through liquefaction or liquification of the component carbohydrates and/or proteins of the tissue fibers. It is believed that the desiccated tissue fibers become more interlinked than the seared tissue fibers and therefore more able to maintain the structural integrity of the reconstituted meat. By char-marking the portions in a crisscross manner, the desiccated tissue fibers act as a reinforcing "net" for the reconstituted meat. Preferably, after any of these searing and/or char-marking operations, the portions is immediately cooled for a period of between about 1 and 5 minutes to a surface temperature of between about 30° and 50° F. The portions are then placed in gas-impermeable (or vacuum-sealable) packages, e.g. bags, which are then vacuum sealed.

It is noted that these searing and/or char-marking operations are for treating only the outside surfaces of the portions and are not intended to cook through the portions.

Since the portions and their component trims may have collected bacteria during the reconstitution process, they should be pasteurized or sterilized. The pasteurization process may be performed either before or after the portions are placed in the vacuum sealable packages, and which is preferably performed by irradiation means such as, for example, an electronic pasteurization device capable of sending X-ray or E-beam (electron beam) through the thickness of each portion so as to ensure the destruction of all (or a substantial amount of) bacteria, including those residing at the cohesive bonds between the adjoining trims. The packaged portions may thereafter be stored in a conventional freezer environment at about −15° F.±5° for shipment to end-users such as, for example, restaurants, caterers, retail establishments or retail consumers. Thereafter, the end-users may prepare or cook the reconstituted meat in any number of ways, e.g., boil in a bag, microwave in a bag, broil over direct flame or pan fry (of course, without the bag).

It has been found that the reconstituted meat made in accordance with the present invention does not fall apart during normal cooking conditions. Moreover, the reconstituted meat is as tasty as whole meat and has qualities that are essentially indistinguishable from those of whole meat.

While it is presently contemplated to form the reconstituted meat product from trims, all of which are of the same type of meat, e.g. beef, pork, salmon or tuna, it is within the contemplation of this invention to form reconstituted meat products from a blend of meats, i.e., from trims from different meats such as, for example, beef and pork, and unless otherwise expressly limited, the trims should be construed to include such blends.

Thus, while there have been shown and described and pointed out fundamental novel features of the invention as applied to a preferred embodiment thereof, it will be understood that various omissions and substitutions and changes in the form and details of the method disclosed may be made by those skilled in the art without departing from the spirit of the invention. For example, it is expressly intended that all combinations of those method steps which perform substantially the same function in substantially the same way to achieve the same results are within the scope of the invention. Moreover, it should be recognized that method steps described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of reconstituting meat from trims, comprising the steps of:
   a. freezing the trims;
   b. defrosting the frozen trims by heating the trims to above the freezing point so that purge forms on the outer surface of the trims;
   c. configuring the defrosted trims to form a preselected shape;
   d. holding the configured trims at a temperature above the freezing point for a preselected time so that the cellular protein in the purge becomes gelatinous; and
   e. then freezing the configured trims by placing the configured trims in a heat transfer relationship with a cooled brine containing at least about 0.005% by weight of a cruciferous oil.

2. The method of claim 1, wherein the cooled brine contains from about 0.005% to about 0.018% by weight of a cruciferous oil.

3. The method of claim 1, wherein the cruciferous oil is rapeseed oil.

4. The method of claim 1, wherein the temperature of the cooled brine is between about −22° and about −46° F.

5. The method of claim 1, wherein the temperature of the cooled brine is between about −37° and −41° F.

6. The method of claim 1, wherein the defrosted trims are configured by using a mold.

7. The method of claim 6, wherein said mold with the trims therewithin is placed on a tray having a bottom surface so that said mold is in heat transferring relationship with said bottom surface of said tray, and said bottom surface of said tray is placed in contact with said cooled brine.

8. The method of claim 6, further comprising the steps of removing from the mold the frozen configured trims and then searing an outside surface of the frozen configured trims.

9. The method of claim 6, further comprising the steps of removing from the mold the frozen configured trims and then char-marking the frozen configured trims.

10. The method of claim 1, further comprising the step of compressing the configured trims prior to freezing the configured trims.

11. The method of claim 1, wherein the configured trims are frozen by placing the configured trims in a heat transfer relationship with the cooled brine by immersing a mold having the trims disposed therein in the brine.

12. The method of claim 1, wherein the trims are placed in a heat transfer relationship with the cooled brine in the initial freezing step.

13. The method of claim 1, wherein the defrosting step comprises heating the trims to a temperature not greater than about 37° F.

14. The method of claim 13, further comprising the step of holding the configured trims at a temperature no greater than about 37° F. for a preselected time after step c.

15. The method of claim 13, wherein the temperature for holding the configured trims is between about 35° F. and 37° F.

16. The method of claim 15, wherein the preselected holding time is at least about 35 minutes.

17. The method of claim 1, further comprising the step of applying a binding agent to outside surfaces of the trims prior to the step of configuring the trims.

18. The method of claim 17, wherein said binding agent is calcium chloride.

19. The method of claim 17, wherein said binding agent is sodium chloride.

20. The method of claim 17, wherein said binding agent is ground dehydrated bone.

21. The method of claim 1, further comprising the step of pasteurizing the frozen configured trims by irradiating the trims by one of X-ray and electron beam.

* * * * *